United States Patent Office 3,541,835
Patented Nov. 24, 1970

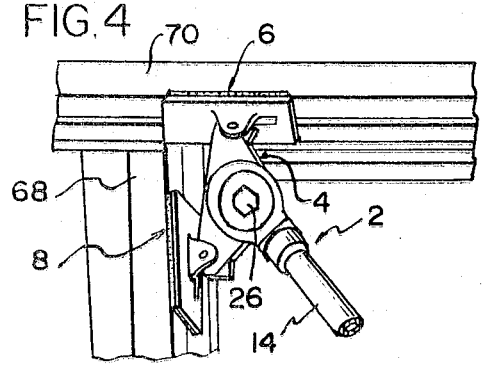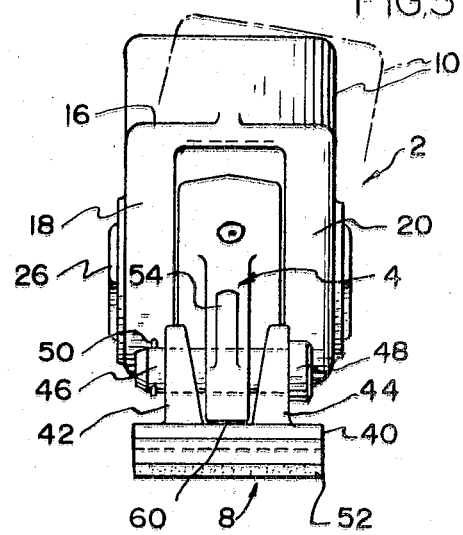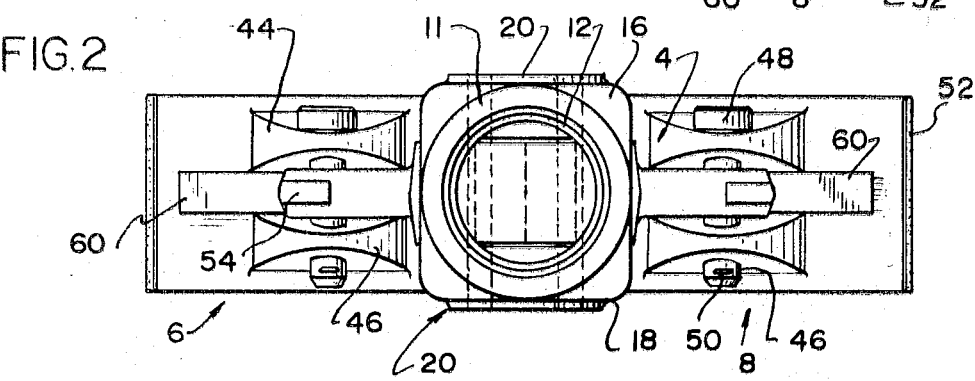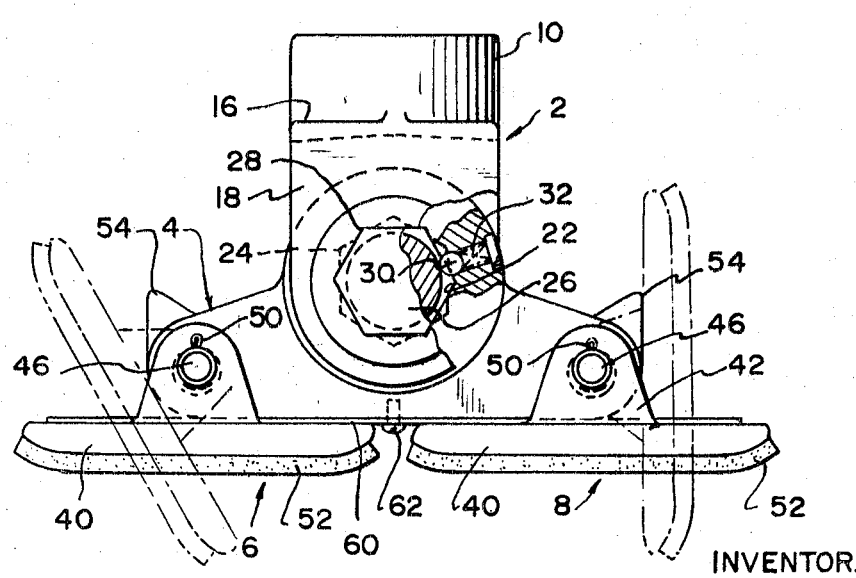

---

3,541,835
WEDGE HEAD APPARATUS
Wayne E. Hunnicutt, Big Bend, Wis., assignor to Applied Power Industries, Inc., Milwaukee, Wis., a corporation of Wisconsin
Filed Dec. 22, 1967, Ser. No. 692,747
Int. Cl. B21j 13/00
U.S. Cl. 72—446
10 Claims

ABSTRACT OF THE DISCLOSURE

An adjustable wide-angle wedge head apparatus for use in conjunction with a means for positioning and applying force to the apparatus to produce compressive engagement of irregular surface areas. The wedge head includes a fork member which is adjustably connected to a laterally elongated yoke member at substantially the mid-point of the yoke member. A pair of pressure pads are rotatably connected at opposed ends of the yoke member and are freely rotatable at the ends of the yoke member which can be tilted relative to the plane of each of the pads. When the wedge head apparatus is applied to a non-uniform surface, such as may be found in automobile door openings, the pressure pads automatically adjust themselves with respect to the surfaces desired to be engaged. A force may then be applied by suitable means to the fork member of the apparatus in a preselected direction. This force or load is distributed through the fork member to the yoke member and pressure pads.

---

The wedge head of the invention has been designed for use in the application of corrective loads to generally non-uniform surfaces of the type which are commonly found in automobile door openings, pillars, roofs, trunk openings, quarter panels, frame elements, unitized body sections, and other structures. The apparatus is designed to apply a load which is broadly distributed to one or more structural surfaces which may require movement because of improper alignment.

In automobile repair, there is a frequent need for an apparatus which can be applied to the softer non-uniform sheet metal surfaces comprising the auto body to straighten such surfaces or to correct faults or defects therein. It is necessary, however, in making such auto body adjustments that the surfaces adjacent the damaged or defected area being serviced remain undamaged when corrective force is applied to the subject wedge head apparatus. This is accomplished in the apparatus of the invention by distributing the loads applied to the fork and yoke elements over a relatively substantially resilient pressure pad surface.

In devices where corrective forces are applied directly to a small damaged area, the force or lead applied to the relatively yielding metal in the damaged area frequently results in the puncture or further distortion of the damaged area instead of its restoration. By spreading the force loads over substantial areas encompassing damaged and undamaged body portions, s in the apparatus of the present invention, it is possible to relatively easily repair most of such damaged areas.

The wedge head apparatus of the invention is designed with a fork which is adjustably connected for rotation to a yoke member. The yoke member is laterally elongated, and the opposed ends thereof are each connected to a pressure pad, each of which is rotatable independently of the rotation between the fork and the yoke member and can be tilted in relation to the vertical plane of the yoke. For best results, the pads are spring-biased with respect to the yoke member to cause them to assume a normal angular relationship with respect to the longitudinal axis of the yoke member when no force is applied to the apparatus.

When the apparatus is brought into compressive engagement with the non-uniform surfaces of a structure, such as an automobile door opening or other structure embodying converging surfaces at a relatively wide angle, the pressure pads automatically adjust themselves with respect to the defective surfaces as well as the yoke member. The fork member to which a corrective force or load is applied from a preselected source, may be rotated with respect to the yoke member to a preselected position in order to direct the correcting force to the widely spread apart pressure pads in the desired manner. This directing of corrective forces may involve directly a substantial force to one of the pressure pads and only what would amount to a gripping or holding force to the other of the pads. It may also involve an essentially equal distribution of the correcting forces to both pads or variations between these extremes. The direction of corrective forces is controlled by the apparatus user to correct damage or defects as desired.

The wedge head apparatus of the invention is an economical, time saving device which can be used extensively in repair and corrective procedures to repair or alter specific structural elements while preventing damage to previously finished or undamaged surfaces.

Various objects of the invention will hereinafter become more fully apparent from the following description of the drawings illustrating presently preferred embodiments thereof and wherein:

FIG. 1 is a front elevation of the wedge head apparatus of the invention with some parts broken away for clarity, and illustrating by dotted lines alternate positions of pressure pad elements thereof;

FIG. 2 is a top plan view of the apparatus illustrated in FIG. 1;

FIG. 3 is a side elevation of the apparatus illustrated in FIG. 1; and

FIG. 4 is a perspective view of the apparatus of the invention disposed in operative relationship with respect to converging non-uniform structural surfaces.

Referring now particularly to FIGS. 1, 2 and 3, it can be seen that the wedge head apparatus of the invention consists of three basic elements, namely a fork member, generally designated 2; a yoke member, generally designated 4; and a pair of pressure pads, generally designated 6 and 8, respectively.

As can be seen in the drawings, the fork member 2 is formed with a generally cylindrical open-ended top or end portion 10 which is provided with internal thread 12, as shown in FIG. 2. The threaded open-ended top portion of fork member 2 is designed to threadedly engage a tubular member such as 14 shown in FIG. 4. The tubular member acts to assist in the positioning of the wedge-head apparatus of the invention and to transmit a force or load to the apparatus in the correction of damaged or defective surfaces.

In fabricating the fork member 2, the cylindrical top portion 10 thereof extends to and is joined by an integral shoulder portion 16 which projects downwardly from the cylindrical top or end portion 10 in a manner providing a pair of legs 18 and 20, best illustrated in FIG. 3. As is shown, the legs are preferably disposed in spaced generally parallel relationship. FIG. 1 shows that the legs 18 and 20 of the fork member 2 are provided with a centrally located symmetrical hexagonal or six point apertures 22. The symmetrical hexagonal apertures formed in each of the legs 18 and 20 are aligned in precise relationship with each other.

As is best shown in FIG. 3, the legs 18 and 20 of the fork member 2 are positioned in straddling relationship with respect to the upper central portion of the laterally elongated yoke member 4. Referring particularly to FIG. 1, it can be seen that the yoke member 4 is provided with a symmetrical twelve point aperture indicated as 24. The diameter of the twelve point aperture in the yoke member 4 is such that it can be selectively aligned with the hexagonal or six point apertures formed in each of the legs 18 and 20 of the fork member 2 in a number of selected positions.

A hexagonal pin 26, best seen in FIG. 1, is inserted through either one of the apertures 22 in leg 18 or 20 through the prealigned twelve point aperture 24 of yoke member 4 and into the opposite leg of the fork member leg. The hexagonal pin is generally symmetrical across the entirety of its longitudinal axis with the exception of an annular groove 28 provided mid-way between the ends of the pin 26. This groove 28 is of a sufficient depth to permit a ball 30 contained within an aperture formed in the yoke member 4 to rest therein. The ball 30, as can be seen in FIG. 1, is normally biased in a radially inward direction by a spring 32 which is retained within the aperture by a washer 34. The groove 28 in combination with the spring-biased ball 30 serves to provide a detent which acts to retain the hexagonal pin 26 in a fixed position with respect to legs 18 and 20 of fork member 2 and yoke member 4 and to prevent the accidental axial displacement of the pin with respect to these elements of the apparatus. The detent, however, is not of a character such that the hexagonal pin 26 cannot be readily manually removed from its position joining the fork and yoke members in predetermined angular relationships.

When it is desired to change a preselected angular relationship between the fork and yoke members, the hexagonal pin 26 is simply manually dislodged from the detent and is removed axially from the apertures 22 and 24 in the members. The points of the respective apertures 22 and 24 can be readily realigned to produce another angular relationship between the legs of fork member 2 and the yoke member 4. This angular relationship becomes fixed upon reinsertion of the pin into engagement with the members.

While a multi-sided pin and cooperable openings are shown to provide a means for fixing a number of angular relationships between fork member 2 and yoke member 4 of the wedge head apparatus of the invention, a friction joint could be utilized which would permit the selection of an infinite number of angular relationships between the fork member 2 and yoke member 4 which could be achieved by merely rotating one of the members with respect to the other against the friction of the connecting joint. While a positive means for locking the angular disposition of the fork member 2 with respect to the yoke member 4 is preferred in the utilization of the subject wedge head, a freely rotating arrangement wherein the fork member 2 and yoke member 4 can be rotated about a cylindrical pin (not shown) could provide an acceptable alternative in some applications.

Referring now to the pressure pads 6 and 8 shown in the drawings, it can be seen that each of the respective pads consists of an essentially flat base portion 40 from which a pair of vertically extending spaced apart fingers 42 and 44 project. The pressure pads 6 and 8 are rotatably secured in straddling relationship with respect to opposed ends of the laterally elongated yoke member 4 by clevis pins 46 which project through openings in fingers 42 and 44 and the respective ends of yoke member 4. The clevis pin openings in the yoke member 4 are made somewhat larger than the diameter of the clevis pin 46 to permit a predetermined tilting to occur between the yoke and the pads. The clevis pins 46 are held in place at one end by an enlarged head 48 and at the other end by a cotter pin 50. The bottom surfaces of base portions 40 of pressure pad 6 and 8, which encompass a relatively large surface area, are each provided with a molded-on heavy, live rubber pad 52 which is capable of transmitting and distributing a force or load applied to the apparatus relatively evenly over a non-uniform surface.

As can be best seen in FIG. 1, each of the pads 6 and 8 is freely rotatable with respect to the yoke member 4 and independently thereof. However, the lateral ends of yoke member 4 are provided with projections 54 which extend in normal relationship with respect to the end surfaces of the yoke member 4. The projections 54, as can be seen with respect to the dotted line version of the pad 8, are designed to prevent the pads from being rotated in an arc greater than 90° with respect to the horizontal. However, any angular relationship between zero and 90° can be selectively obtained with either of the pads.

To maintain the substantially flat base portions 40 of the respective pads in generally parallel relationship with the flat bottom surface of the yoke member 4, an elongated leaf spring 60 is secured to the bottom surface of the yoke member 4 by a self-tapping screw 62. This serves to position the leaf spring between the bottom surface of yoke member 4 and the respective top surfaces of base portions 40 of pressure pads 6 and 8. The leaf spring will not prevent the deflection of the pressure pads 6 and 8 from the horizontal when applied against relatively wide angle converging surfaces, such as illustrated in FIG. 4. As soon as the apparatus is moved out of contact with such surfaces, the leaf spring 60 acts to automatically return the pressure pads to their parallel relationship with respect to the bottom surface of yoke member 4.

When the wedge head apparatus of the invention is put to use, such as is shown in FIG. 4, the pads 6 and 8 are brought into contact with converging surfaces 68 and 70 illustrated in FIG. 4. Although the surfaces 68 and 70 illustrated in FIG. 4 are disposed in generally normal relationship, the wedge head apparatus may be used in the treatment of surfaces from purely horizontal to an infinite number of angular variations.

The converging surfaces 68 and 70 shown in FIG. 4 comprise the upper corner portion of an automobile door opening. Ordinarily, such door openings are defined by sheet metal of various gauges which are relatively yielding to forces or loads applied thereto. The surfaces 68 and 70, in addition to being positioned generally in normal relationship, are typically sloped outwardly to accommodate door gasketing and to promote the watertight sealing of the door when in closed position.

When the wedge head apparatus is brought into contact with this corner of the door opening, the pads 6 and 8 are readily deflected from their normal spring-biased parallel relationship with respect to the bottom of the yoke member 4 and are brought into essentially flat surface to surface contact wtih the walls bordering the door opening. To compensate for the slope angle of the converging door opening surfaces 68 and 70, a sufficient space is provided between fingers 42 and 44 of each of the pads, as well as the enlarged openings at the lateral ends of the yoke member 4 through which clevis pins 46 project to permit the yoke member and the fork member carried thereby to assume a tilt angle with respect to both of the pads 6 and 8 thereby effectively compensating for the sloped surfaces. As is shown in FIG. 3, the tilt or slope angle of the yoke member with respect to the pads 6 and 8 can be as much as 10° in the embodiment illustrated. While 10° is preferred for the particular apparatus described herein, it can be seen that smaller or greater tilt angles can be produced with minor modifications in the elements of the apparatus.

Now, the rubber pads 52 molded to the bottom surface of the base portions of the pressure pads resiliently engage the surfaces 68 and 70 bordering the upper corner of the door opening. The pressure pad engagement is spread over a relatively great surface area of the door opening. The yoke member 4 automatically assumes an angular relationship with respect to the pads 6 and 8.

The fork member 2 may be adjusted in a manner described with respect to the yoke member to direct a load transmitted through tube 14 which is threaded into the cylindrical end 10 of the fork member in a preselected direction. In various corrective operations, it may be desirable to apply a greater load or force to the pad 6 in engagement with the surface 70 than is applied to the pad 8 which engages surface 68. To accomplish this in the pad and yoke position illustrated in FIG. 4, the fork member 2 is rotated downwardly a preselected distance, and its position is then fixed with respect to the yoke member in a manner discussed above. This serves to direct the greatest force or load to the pad 6 with a lesser load being directed to pad 8. In some corrective operations, it may be desired to divide the load being applied through tubular member 14 between the pads. This is accomplished by rotating the fork member 2 to a position which will place the fork member 2 in essentially vertical relationship with respect to the bottom surface of the yoke member 4. Other force or load distributions can be accomplished by rotating the fork member 2 with respect to the yoke member 4 to direct the primary load to one or the other of the pads as desired.

The wide-angle wedge head apparatus discussed above therefore is relatively simple in construction, is substantially maintenance-free, simple to use and very effective in the transmission of corrective forces to surfaces being altered and in distributing the forces in a preselected manner over substantial working surface areas to permit surface repair or alteration without producing damage of previously finished or undamaged surfaces.

Various modes of carrying out the invention are contemplated as being within the scope of the following claims particularly pointing out and distinctly claiming the subject matter which is regarded as the invention.

I claim:
1. An adjustable wedge head apparatus comprising a fork member, an elongated yoke member connected to the fork member, the yoke member being rotatably adjustable with respect to the fork member, a pair of pressure pads connected to the yoke member in predetermined spaced relationship with respect to each other, the pads being pivotally connected transversely to the yoke for rotation independent of each other between positions substantially parallel with the bottom of said yoke to positions substantially perpendicular thereto, and means for connecting the wedge head apparatus to a positioning means.

2. The apparatus of claim 1 wherein the pressure pads are provided with resilient pads secured to the working surfaces thereof.

3. The apparatus of claim 1 wherein the yoke member is generally laterally elongated and a pressure pad is rotatably secured adjacent to each of the lateral ends of the yoke member by pin means extending transversely thereto, and the pads are rotatable independently of the yoke member.

4. The apparatus of claim 3 wherein a resilient biasing means is interposed between the yoke member and the pressure pads to flexibly maintain a normal predetermined relationship between the pads and the yoke member.

5. The apparatus of claim 3 wherein the fork member is rotatably connected to the yoke member at a point substantially midway between the lateral ends of the yoke member by a pin means.

6. The apparatus of claim 5 wherein biasing means are provided on the yoke member engageable with a portion of the pin to selectively prevent displacement of the pin from the fork member.

7. The apparatus of claim 1 wherein the yoke member is connected to the pressure pads in a manner permitting the yoke member to assume acute angular relationships with respect to the horizontal plane of the pads.

8. The apparatus of claim 1 wherein the means for connecting the wedge head apparatus to a positioning means comprise a gripping means formed on an end of the fork member.

9. The apparatus of claim 1 wherein the fork and yoke members are connected by a pin having an irregular cross section and permitting fixing of angular relationships between the fork and yoke members.

10. The apparatus of claim 1 wherein the application of force to the apparatus results in the self-adjustment of the position of the pressure pads in correspondence with the surfaces to which they are applied.

References Cited

UNITED STATES PATENTS

| | | | |
|---|---|---|---|
| 1,820,727 | 8/1931 | Bayles | 248—357 |
| 1,519,946 | 12/1924 | Williams | 254—101 X |
| 315,668 | 4/1885 | Sergeant | 254—101 |
| 2,311,041 | 2/1943 | Ferguson | 72—705 X |
| 2,444,250 | 6/1948 | Ferguson | 72—705 X |
| 2,185,550 | 1/1940 | Gerdes | 72—705 |
| 1,065,060 | 6/1913 | Leyner | 254—101 |
| 333,077 | 12/1885 | Ingersoll | 254—101 |

FOREIGN PATENTS 512,486 9/1939 Great Britain.

OTHER REFERENCES

Easy Methods—Blackhawk, February 1937, p. 22.

CHARLES W. LANHAM, Primary Examiner

A. L. HAVIS, Assistant Examiner

U.S. Cl. X.R.

72—705; 254—101